(12) United States Patent
Berkebile et al.

(10) Patent No.: US 10,881,989 B2
(45) Date of Patent: Jan. 5, 2021

(54) SELF-CLEANING, GROUTLESS, FILTER UNDERDRAIN

(71) Applicant: Xylem Water Solutions Zelienople LLC, Zelienople, PA (US)

(72) Inventors: Dean T. Berkebile, Cranberry Township, PA (US); Scott R. Cable, Zelienople, PA (US); John L. Geibel, Butler, PA (US); Robert J. Green, Butler, PA (US); Howard J. Sweeney, Cranberry Township, PA (US); Robert Lee Wiley, Jr., Ellwood City, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 289 days.

(21) Appl. No.: 15/980,955

(22) Filed: May 16, 2018

(65) Prior Publication Data

US 2018/0333659 A1 Nov. 22, 2018

Related U.S. Application Data (60) Provisional application No. 62/506,883, filed on May 16, 2017.

(51) Int. Cl.
*B01D 24/24* (2006.01)
*B01D 24/46* (2006.01)
*B01D 24/00* (2006.01)
*B01D 24/14* (2006.01)

(52) U.S. Cl.
CPC ....... *B01D 24/4636* (2013.01); *B01D 24/001* (2013.01); *B01D 24/14* (2013.01); *B01D 24/24* (2013.01)

(58) Field of Classification Search
CPC ...... B01D 24/001; B01D 24/14; B01D 24/24; B01D 24/4636
See application file for complete search history.

(56) References Cited

U.S. PATENT DOCUMENTS

| | | | |
|---|---|---|---|
| 1,805,667 A | * | 5/1931 | Jenks ............... B01D 24/001 210/510.1 |
| 4,634,312 A | | 1/1987 | Sterzel |
| 4,923,606 A | | 5/1990 | Gresh et al. |
| 5,108,627 A | | 4/1992 | Berkebile et al. |
| 5,160,614 A | | 11/1992 | Brown |
| 5,328,608 A | | 7/1994 | Bergmann et al. |

(Continued)

FOREIGN PATENT DOCUMENTS

| | | | | |
|---|---|---|---|---|
| EP | 0421920 A1 | * | 4/1991 | ......... B01D 24/4631 |
| KR | 101435017 B1 | | 8/2014 | |

*Primary Examiner* — Matthew O Savage
(74) *Attorney, Agent, or Firm* — The Webb Law Firm (57) ABSTRACT

An underdrain block for filtering water includes a top wall, a bottom wall, and two side walls connecting the top wall to the bottom wall to define an internal chamber. The bottom wall contains a plurality of orifices that allow liquid and solid materials to enter and exit the internal chamber. An underdrain filtering system can be formed by securing an underdrain lateral, which is formed from one or a plurality of underdrain blocks, to a filter floor. Also included is a method of preparing an underdrain lateral for providing even distribution of backwash water along the underdrain lateral and a method of validating even distribution of backwash water across an underdrain lateral.

18 Claims, 9 Drawing Sheets

(56) References Cited

U.S. PATENT DOCUMENTS

| | | |
|---|---|---|
| 5,865,999 A | 2/1999 | Shea et al. |
| 6,090,284 A | 7/2000 | Melber et al. |
| 6,143,188 A | 11/2000 | Jantsch, Sr. et al. |
| 6,325,931 B1 * | 12/2001 | Roberts ............... B01D 24/001 210/274 |
| 6,797,166 B1 | 9/2004 | Hambley et al. |
| 6,843,920 B1 | 1/2005 | Darmawan |
| 8,889,003 B2 | 11/2014 | Berkebile et al. |
| 2015/0273364 A1 | 10/2015 | Roberts et al. |
| 2015/0283491 A1 | 10/2015 | Salahshour et al. |
| 2016/0193550 A1 | 7/2016 | Meurer |

* cited by examiner

SELF-CLEANING, GROUTLESS, FILTER UNDERDRAIN

CROSS REFERENCE TO RELATED APPLICATIONS

This application claims priority to U.S. Provisional Application No. 62/506,883 filed May 16, 2017, which is incorporated herein by reference in its entirety.

BACKGROUND OF THE INVENTION

Field of the Invention

The present invention relates to water or waste water filters and, in particular, to a self-cleaning filter underdrain.

Description of Related Art

Gravity filters are used to separate suspended solids from water. The main components of gravity filters are filtering media and underdrain blocks. Underdrain blocks are generally square, rectangular, or triangular in cross section and have a long longitudinal axis as compared to their cross section. They are attached end-to-end to form long sections called laterals, or are extruded to length, or are fabricated to length. Filter underdrain laterals are typically laid on the floor of the filter tank one next to the other in parallel rows to define gas and liquid flow conduits below a bed of filtering media. The filtering media is used to capture dirt and other undesirable or unwanted materials from a liquid being filtered as the liquid passes through the media.

The gas and liquid flow conduits make possible the collection of filtered liquid during filtration and the distribution of gas and liquid for backwash. Typically, a common main conduit (known as a "flume") is located immediately next to or under the filter tank to collect the effluent filtered liquid from the underdrain laterals during filtration and to distribute gas and/or liquid to the underdrain laterals during gas (typically air) or liquid (typically water) backwash.

Within the chambers of the underdrain, debris, media, chemical precipitation, and/or biological matter can accumulate until underdrain performance is adversely affected. For instance, debris, media, chemical precipitation, and/or biological matter can accumulate to a degree that results in a failure of the underdrain to properly distribute liquids. Moreover, when the underdrain filter is held down with fasteners (e.g. bolts), dead spots underneath the underdrain are often formed where stagnant water accumulates.

Thus, it is desirable to provide a filter underdrain that can be continually cleaned to remove debris, media, chemical precipitation, and/or biological matter from the underdrain and which also prevents the accumulation of stagnant water.

SUMMARY OF THE INVENTION

In accordance with one embodiment of the present invention, an underdrain block includes a top wall, a bottom wall, and two side walls connecting the top wall to the bottom wall to define an internal chamber. Further, the bottom wall, or the lower portion of at least one side wall, or both, has a plurality of orifices that allow liquid and solid materials to enter and exit the internal chamber.

In certain embodiments, the bottom wall has internal channels formed through an inner surface of the bottom wall in which the orifices are positioned within the channels. The internal channels can be shaped into troughs.

In some embodiments, the side walls have additional orifices. At least a portion of the side walls can also be sloped such that the bottom wall has a greater width than the top wall. In certain embodiments, each side wall comprises a sloped section and a non-sloped section. The sloped section extends from the top wall to the non-sloped section and the non-sloped section extends from the sloped section to the bottom wall. In some embodiments, the sloped section of the side walls contains additional orifices and the non-sloped section of the side walls are free of orifices.

The underdrain block can also include an internal wall that extends between the side walls to form a first zone and second zone. In such embodiments, the first zone is formed between the top wall, the side walls, and the internal wall, and the second zone is formed between the bottom wall, the side walls, and the internal wall. In certain embodiments, the side walls of the first zone include additional orifices and the side walls of the second zone are free of orifices. An underdrain lateral can also be formed from one or a plurality of underdrain blocks.

The present invention is also directed to an underdrain filtering system that includes at least one underdrain lateral secured to a filter floor and which is formed from one or a plurality of underdrain blocks that each independently have a top wall, a bottom wall, and two side walls connecting the top wall to the bottom wall to define an internal chamber. The bottom wall, or the lower portion of at least one side wall, or both, includes a plurality of orifices and the underdrain lateral is spaced apart from the filter floor to allow liquid and solid materials to enter and exit the internal chamber through the orifices of the bottom wall.

In certain embodiments, gravel is placed between the filter floor and the underdrain lateral. Gravel can also be placed around at least a portion of the side walls. In some embodiments, the underdrain filtering system is free of grout in at least an area between the underdrain lateral and the filter floor. It is appreciated that the underdrain lateral can be formed from any of the underdrain blocks described herein.

The present invention further includes a method of preparing an underdrain lateral for providing even distribution of backwash water along an underdrain lateral. The method includes: providing one or a plurality of underdrain blocks that each independently have a top wall, a bottom wall, and two side walls connecting the top wall to the bottom wall to define an internal chamber in which the bottom comprises a plurality of orifices that allow liquid and/or solid materials to enter and exit the internal chamber; and forming an underdrain lateral with the one or a plurality of underdrain blocks such that portions of the underdrain lateral or individual underdrain blocks have orifices of different sizes and/or a different quantity of orifices to improve even distribution of the backwash water along an underdrain lateral.

Moreover, the present invention also includes a method of validating even distribution of backwash water across an underdrain lateral. In certain embodiments, the method includes: providing at least one underdrain lateral formed by one or a plurality of underdrain blocks that each independently include a top wall, a bottom wall, and two side walls connecting the top wall to the bottom wall to define an internal chamber, in which the bottom has a plurality of orifices that allow liquid and/or solid materials to enter and exit the internal chamber; measuring an internal pressure of the underdrain lateral at a given zone or individual underdrain block; and calibrating the underdrain lateral to discharge a known volume of backwash water at a given zone or individual underdrain block as a function of the measured internal pressure, a position of at least one zone or underdrain block within the underdrain lateral, and a number of orifices in the bottom wall of the at least one underdrain block. In some embodiments, the underdrain lateral is in-situ field verified to confirm the discharge of the volume of backwash water by comparing the measured internal pressure with known data correlating internal pressure, the position of the at least one underdrain block within the underdrain lateral, and the number of orifices in the bottom wall of the at least one underdrain block.

DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1:
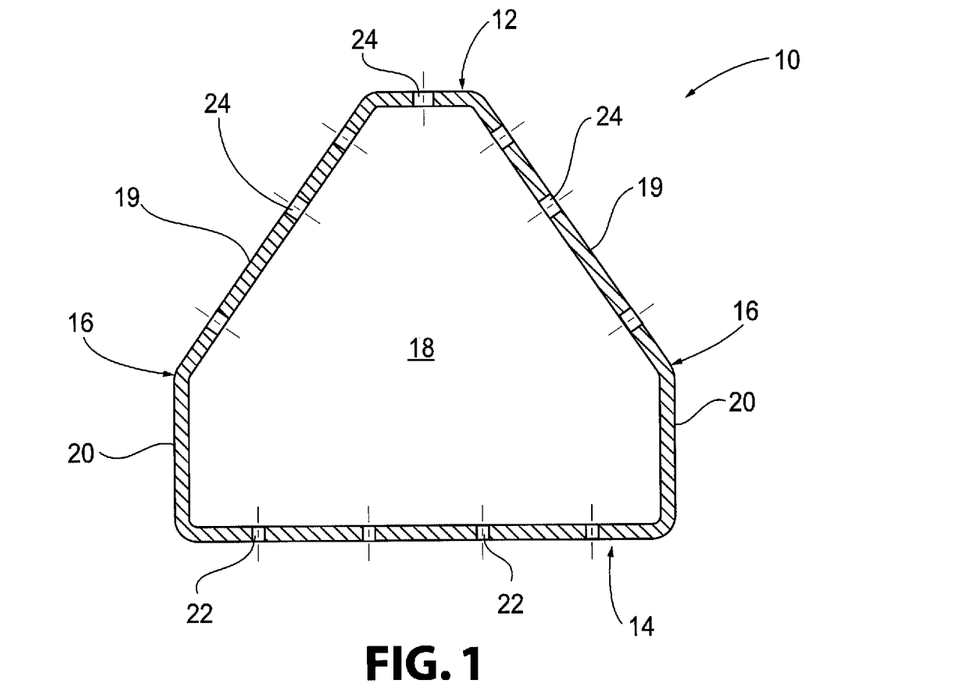
FIG. 1 is a front view of an underdrain block according to one embodiment of the present invention.

As indicated, the present invention is directed to a self-cleaning underdrain filter. In certain embodiments, as shown in FIG. 1, the filter includes an underdrain block 10 having a top wall 12, a bottom wall 14, and a pair of side walls 16 that extend between the top wall 12 and bottom wall 14. The top wall 12, bottom wall 14, and side walls 16 define an internal chamber 18 within the underdrain block 10. The underdrain block 10 can be designed to have various shapes such as a square, rectangle, triangle, and the like. In some embodiments, and as further shown in FIG. 1, at least a portion of the side walls 16 are sloped. For example, and as shown in FIG. 1, at least a portion of the side walls 16 extending from the top wall 12 are sloped such that the bottom wall 14 has a greater width than the top wall 12. It is appreciated that the entire length of the side walls 16 can be sloped. Alternatively, each side wall 16 can have a sloped section 19 that extends from the top wall 12 to a non-sloped section 20, which in turn extends to the bottom wall 14.

When used in a filtering system, filtering media (not shown) is poured on top of the underdrain block 10 to remove undesirable particles from a liquid that is being filtered through the underdrain. The filtering media is also poured between the side walls 16 of consecutively placed underdrain blocks 10. As previously described, the underdrain block 10 can have sloped side walls 16. It was found that the sloped side walls 16 help promote movement of the media toward areas of high effective cleaning (conducted during backwashing).

In accordance with the present invention, the underdrain block 10 has orifices 22 that extend through the bottom wall 14. The bottom wall 14 can have multiple rows of orifices 22 that are configured to allow liquids, such as water, as well as materials, such as media and debris, to enter and exit the internal chamber 18 of the underdrain block 10. The size and number of orifices 22 can be selected based on the size and shape of the underdrain block 10 as well as other factors including the types of media placed over the underdrain block 10 and the water pressure used during backwashing. For instance, the number of orifices 22 can be selected to reduce backwash air and water maldistribution. The orifices 22 can also include various shapes such as circular holes, oblong holes, slots, and any combination thereof. As used herein, "backwashing" refers to a process in which clean water and, optionally, a gas such as air, are pumped into the internal chamber 18 of the underdrain block 10 to remove undesirable or unwanted materials from the underdrain block 10 and the filtering media.

Figure 2:
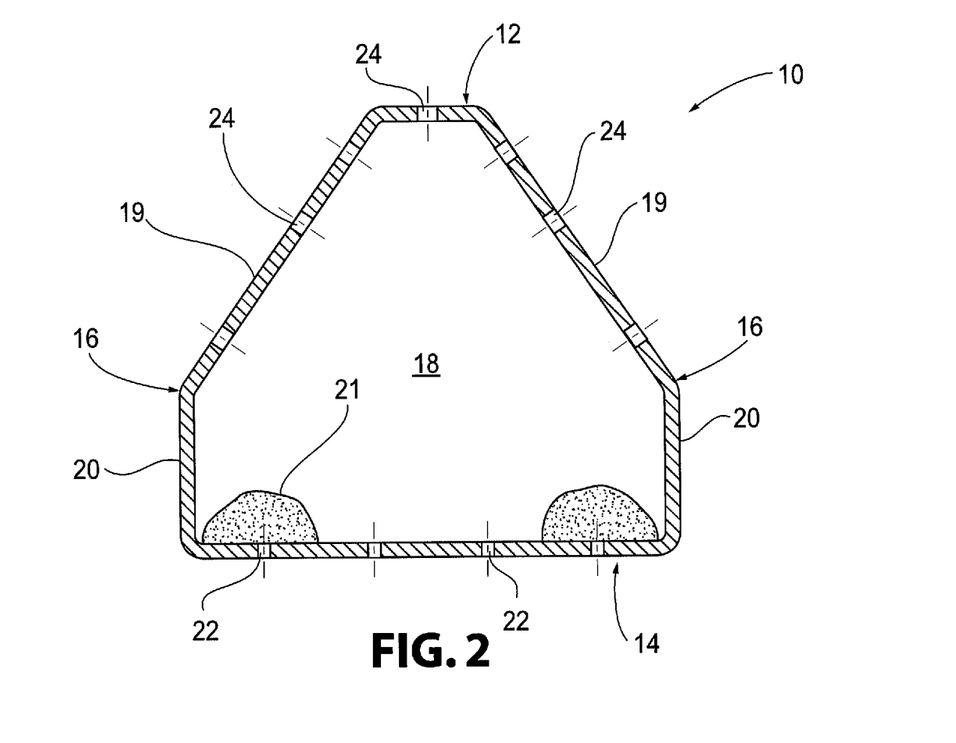
FIG. 2 is a front view of the underdrain block shown in FIG. 1 containing unwanted or undesirable filter media.

It was found that the orifices 22 in the bottom wall 14 allow filtered water to enter the internal chamber 18 of the underdrain block 10 and flow toward a flume (not shown), while also allowing water and other materials (e.g. debris, media, chemical precipitation, and biological matter) to exit the internal chamber 18 such as during a backwashing process. FIG. 2 illustrates sand 21 found in the internal chamber 18 of the underdrain block 10 prior to a backwashing process. In addition, because backwashing water is forced through the orifices 22 of the bottom wall 14, stagnant water formed underneath the underdrain block 10 is removed by the flow of the backwashing water.

In certain embodiments, referring to FIG. 1, at least a portion of the side walls 16 and/or the top wall 12 also have orifices 24. The side walls 16 and top wall 12 can each independently have one or multiple rows of orifices 24. When multiple orifices 24 are formed in the side walls 16 and/or top wall 12, the different orifices 24 can have the same size or different sizes. In certain embodiments, the top portion of the side walls 16 have orifices 24 while the bottom portion of the side walls 16 are free of orifices 24.

In some embodiments, the side walls 16 of the underdrain block 10 can have a sloped section 19 that extends from the top wall 12 to a non-sloped section 20, which in turn extends to the bottom wall 14. As shown in FIG. 1, orifices 24 can extend along the sloped section 19 while the non-sloped section 20 is free of orifices 24. FIG. 1 further shows orifices 24 formed through the top wall 12 of the underdrain block 10.

It is appreciated that orifices 24 can also be formed along the non-sloped section 20, if desired, as well as through at least a portion of the side walls 16 that are completely sloped from the top wall 12 to the bottom wall 14. The additional orifices 24 formed through the side walls 16 and the top wall 12 have been found to further promote movement of the filtering media toward areas of high effective cleaning conducted during backwashing. The additional orifices 24 can also allow some of the filtered water to enter the internal chamber 18.

The previously described orifices 22 and 24 can be formed by a cutting process including, but not limited to, laser cutting. Alternatively, the orifices 22 and 24 can be formed during the molding of underdrain block 10. As such, the orifices 22 and 24 can be formed simultaneously with the underdrain block 10 itself.

Figure 3:
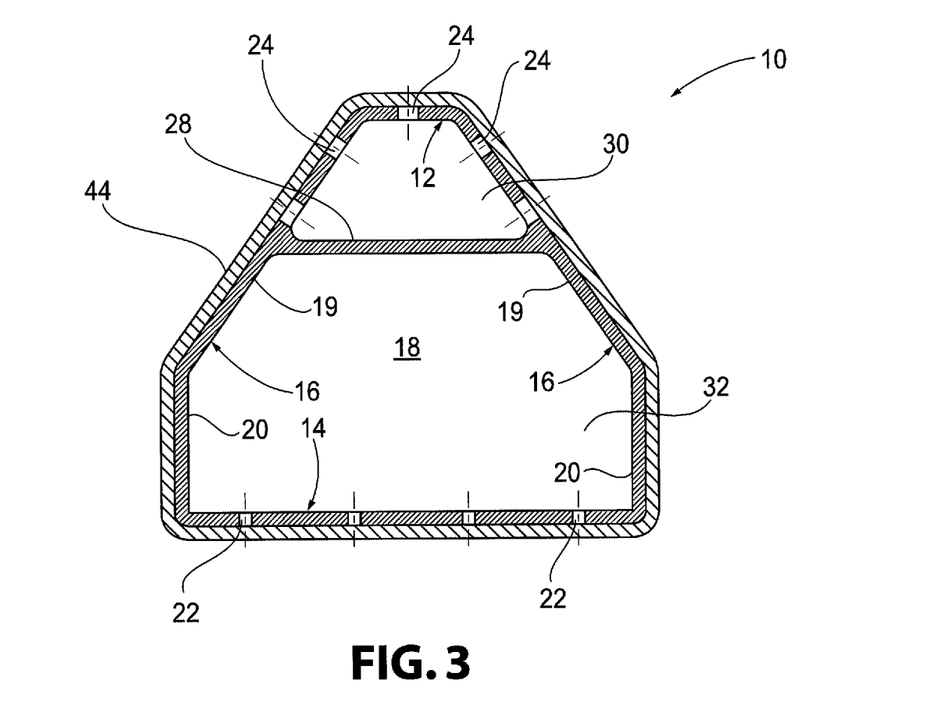
FIG. 3 is a front view of an underdrain block according a second embodiment of the present invention.

In certain embodiments, as shown in FIG. 3, the underdrain block 10 can include an internal wall 28 that extends between the side walls 16. The internal wall 28 forms two separate zones within the internal chamber 18: (i) a first zone 30 formed between the top wall 12, the side walls 16, and the internal wall 30; and (ii) a second zone 32 formed between the bottom wall 14, the side walls 16, and the internal wall 28. The first zone 30 can be used as an air distribution chamber in which air only is distributed through the first zone 30. In such embodiments, the second zone 32 is used as a water distribution chamber in which water only is distributed through the second zone 32. Further, the previously described additional orifices 24 can be positioned through the side walls 16 and top wall 12 of the underdrain block 10 that form the first zone 30, the second zone 32, or both. In some embodiments, referring to FIG. 3, additional orifices 24 are positioned through the side walls 16 and top wall 12 of the underdrain block 10 that form the first zone 30, while the side walls 16 that form the second zone 32 are free of additional orifices 24.

Figure 4:
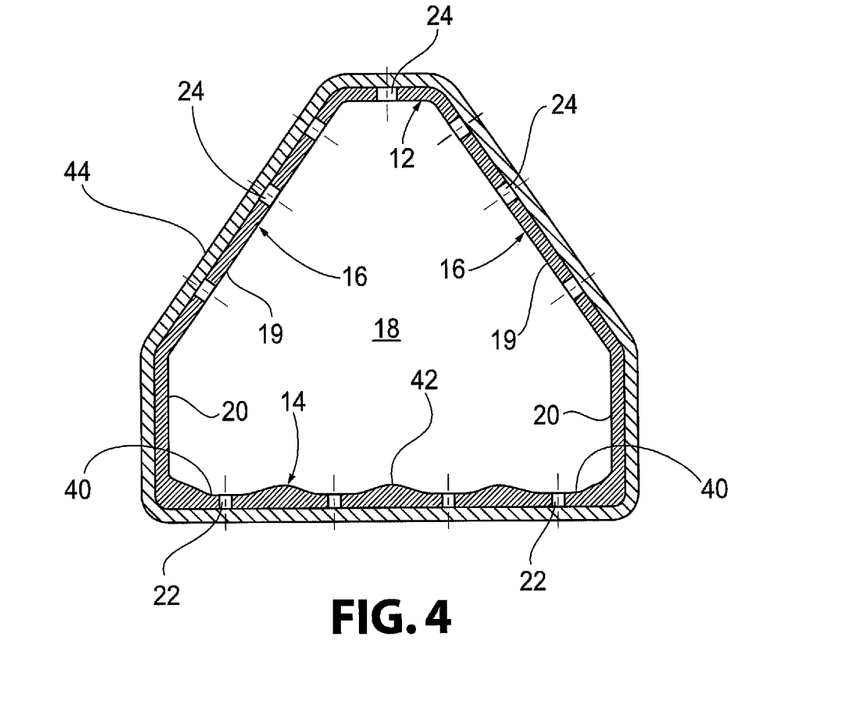
FIG. 4 is a front view of an underdrain block according to a third embodiment of the present invention.
Figure 5:
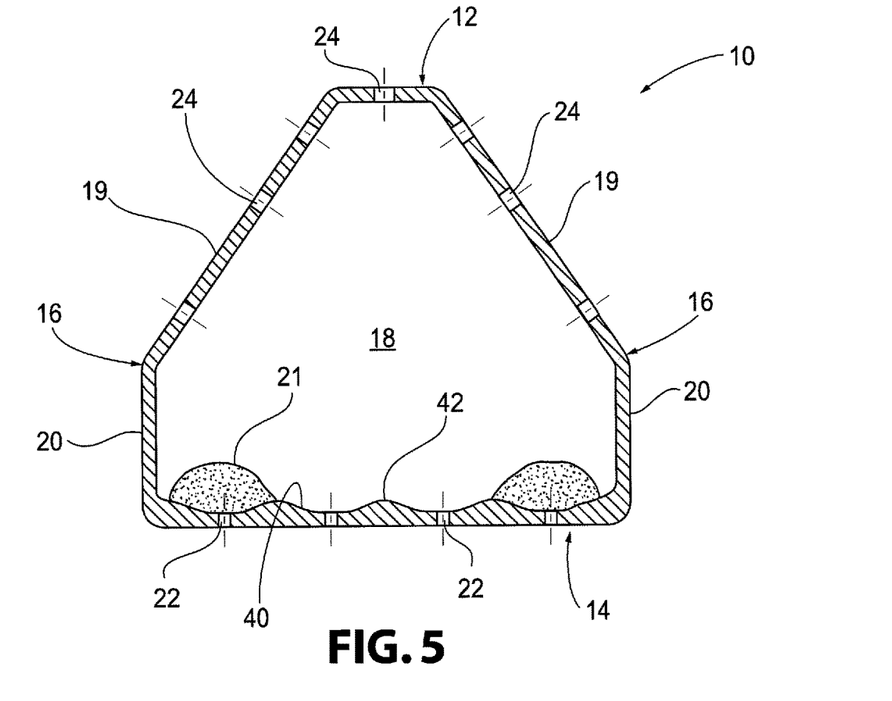
FIG. 5 is a front view of the underdrain block shown in FIG. 4 containing unwanted or undesirable filter media.

In certain embodiments, referring to FIG. 4, the underdrain block 10 can include internal channels 40 that are formed into the inner surface 42 of the bottom wall 14 found in the internal chamber 18. The channels 40 extend along the length of the underdrain block 10 (from the front to the back of the underdrain block 10). As shown in FIG. 4, the orifices 22 formed in the bottom wall 14 are positioned within the channels 40 such as in a bottom area of the channels 40. The channels 40 are shaped such that liquids and other materials are directed into the channels 40 where the orifices 22 are positioned. In some embodiments, the channels 40 are formed into the shape of a trough and the orifices 22 are positioned at the bottom of the trough. The channels 40 help direct undesirable or unwanted materials (e.g. debris, media, chemical precipitation, and biological matter) accumulating within the internal chamber 18 toward the orifices 22 formed within the bottom wall 14. During backwashing, these undesirable or unwanted materials are removed from the internal chamber 18 with the help of the channels 40. FIG. 5 illustrates sand 21 directed into the channels 40 of the underdrain block 10.

It is appreciated that the channels 40 can be used with any of the previously described underdrain blocks 10. For instance, FIG. 4 illustrates channels 40 formed in an underdrain block 10 having side walls 16 with a sloped section 19 that extends from the top wall 12 to a non-sloped section 20 which in turn extends to the bottom wall 14, and additional orifices 24 that are formed in the sloped sections 19 of the side walls 16.

Figure 6:
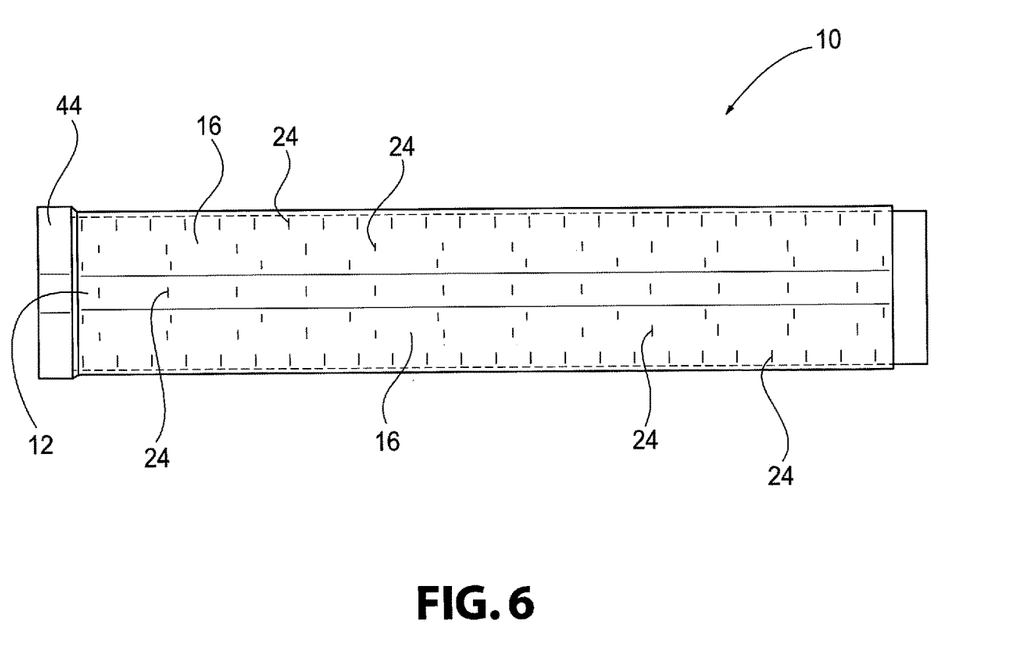
FIG. 6 is a top view of the underdrain block shown in FIG. 4.
Figure 7:
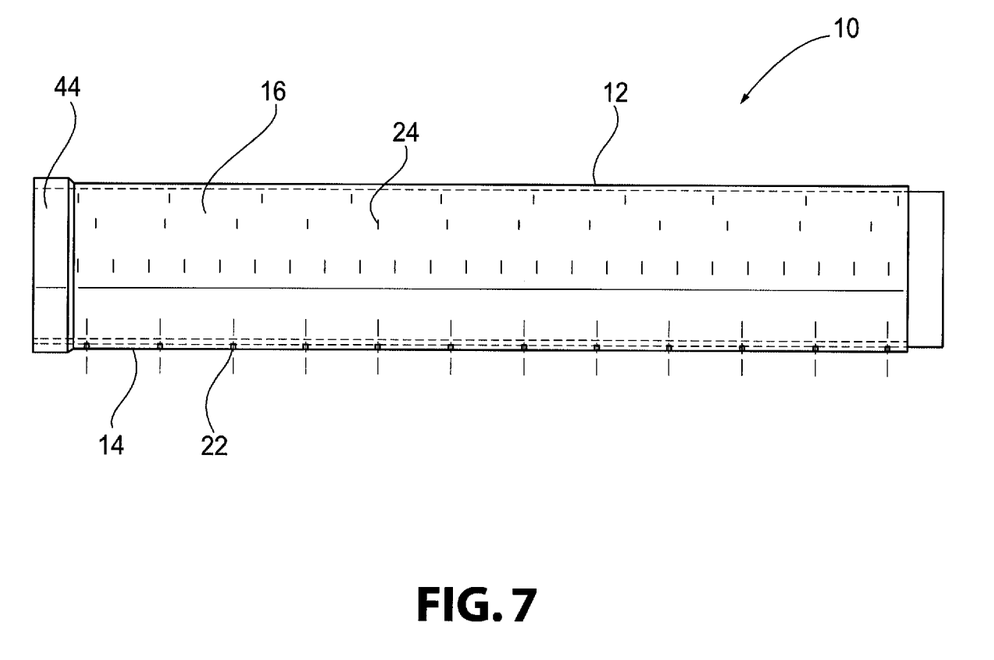
FIG. 7 is a side view of the underdrain block shown in FIG. 4.
Figure 8:
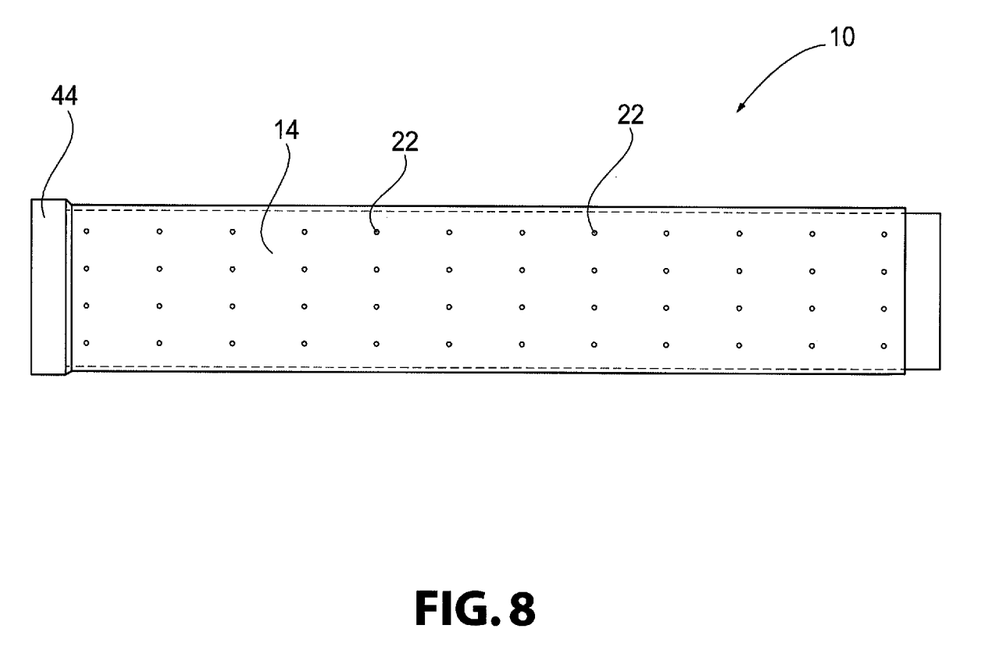
FIG. 8 is a bottom view of the underdrain block shown in FIG. 4.
Figure 9:
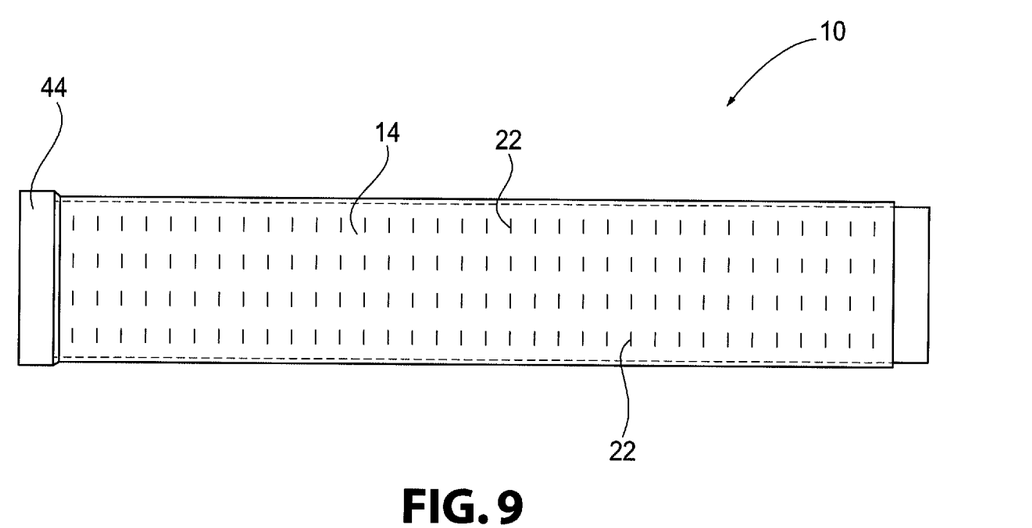
FIG. 9 is another bottom view of the underdrain block shown in FIG. 4 with different orifices.

The previously described underdrain block 10 can also be used to form underdrain laterals. For example, the underdrain blocks 10 can be configured to receive respective ends of adjacent underdrain blocks 10 so that a plurality of underdrain blocks 10 may be secured end-to-end to form an underdrain lateral. In such embodiments, the underdrain blocks 10 can be attached to each other with a connector 44. FIGS. 3 and 4 illustrate a front view of an underdrain block 10 with a connector 44 attached to an end of the underdrain block 10. FIG. 6 illustrates a top view of the underdrain block 10 shown in FIG. 4. Further, FIG. 7 illustrates a side view of the underdrain block 10 of FIG. 4, and FIGS. 8 and 9 illustrate bottom views of the underdrain block 10 of FIG. 4 with FIG. 8 illustrating holes for the orifices 22 and FIG. 9 illustrating slots for the orifices 22. In certain embodiments, the underdrain blocks 10 are instead extruded or fabricated to length to form the underdrain laterals. It is appreciated that the underdrain laterals will have the same respective features as the underdrain blocks 10.

Figure 10:
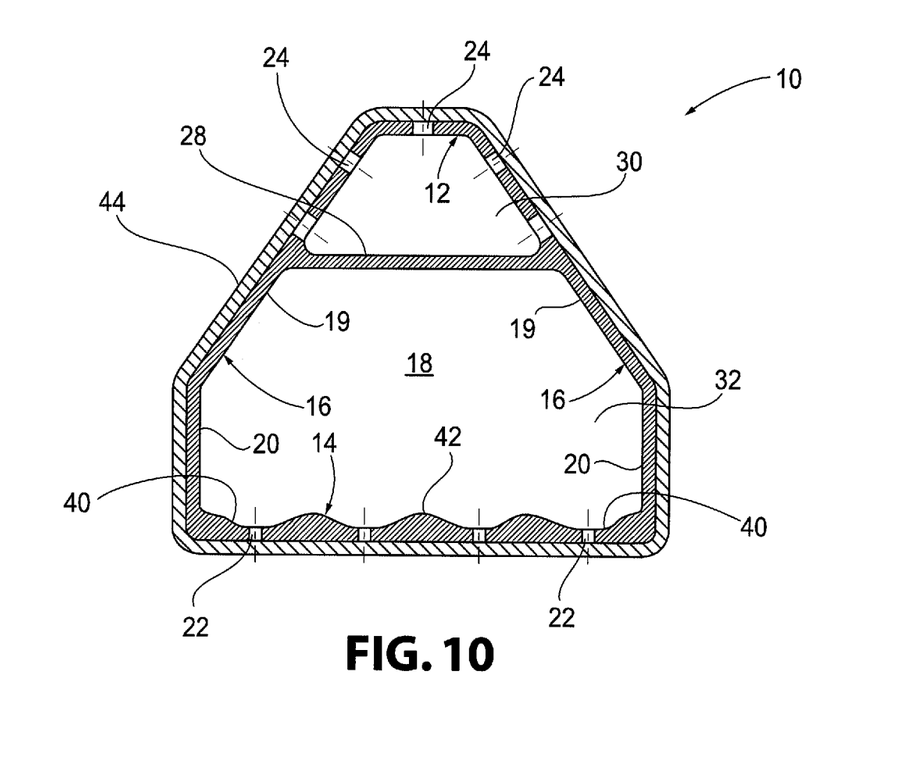
FIG. 10 is a front view of an underdrain block according to a fourth embodiment of the present invention.
Figure 11:
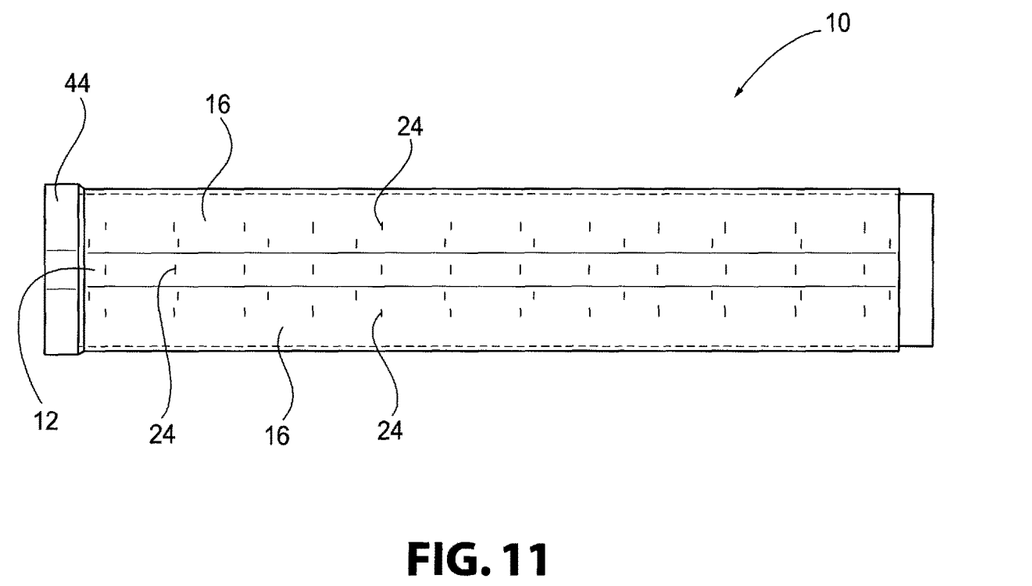
FIG. 11 is a top view of the underdrain block shown in FIG. 10.
Figure 12:
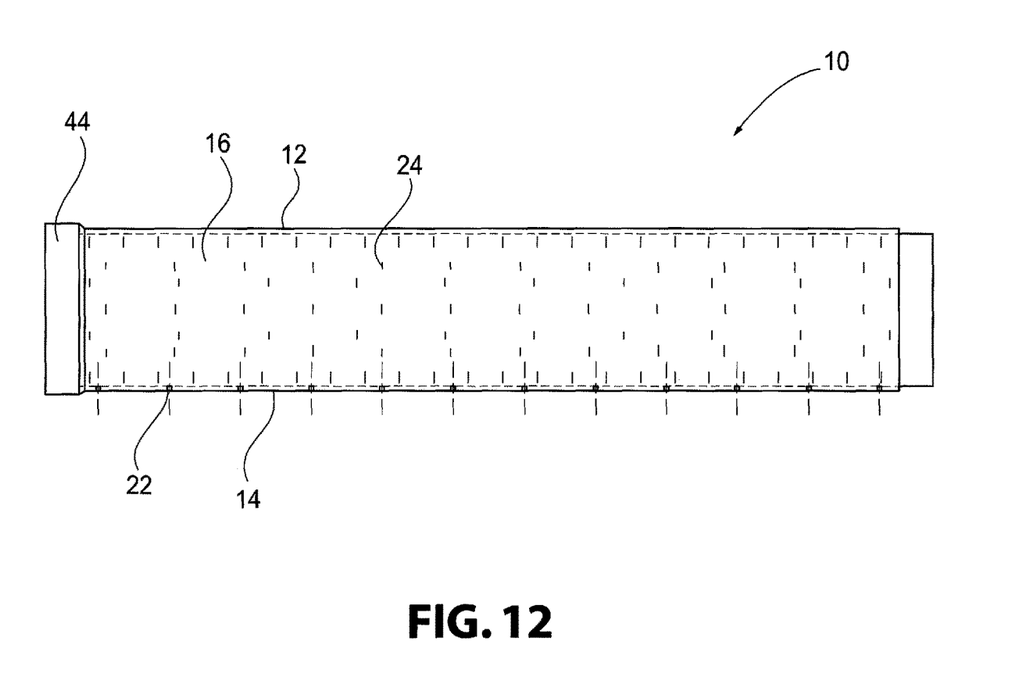
FIG. 12 is a side view of the underdrain block shown in FIG. 10 and which includes additional orifices along the entire side walls.

The underdrain laterals can be formed from any of the previously described underdrain blocks 10. For example, FIG. 10 illustrates channels 40 formed in an underdrain block 10 having side walls 16 with a sloped section 19 that extends from the top wall 12 to a non-sloped section 20 which in turn extends to the bottom wall 14, an internal wall 28 that extends between the side walls 16 to form the previously described first and second zones 30 and 32, and additional orifices 24 that are formed in the sloped sections 19 of the side walls 16 that form the first zone 30. As further shown in FIG. 10, a connector 44 is attached to an end of the underdrain block 10 in order to form an underdrain lateral. FIG. 11 illustrates a top view of the underdrain block 10 shown in FIG. 10, and FIG. 12 illustrates a side view of the underdrain block 10 of FIG. 10 but which includes additional orifices 24 along the entire side walls 16.

Figure 13:
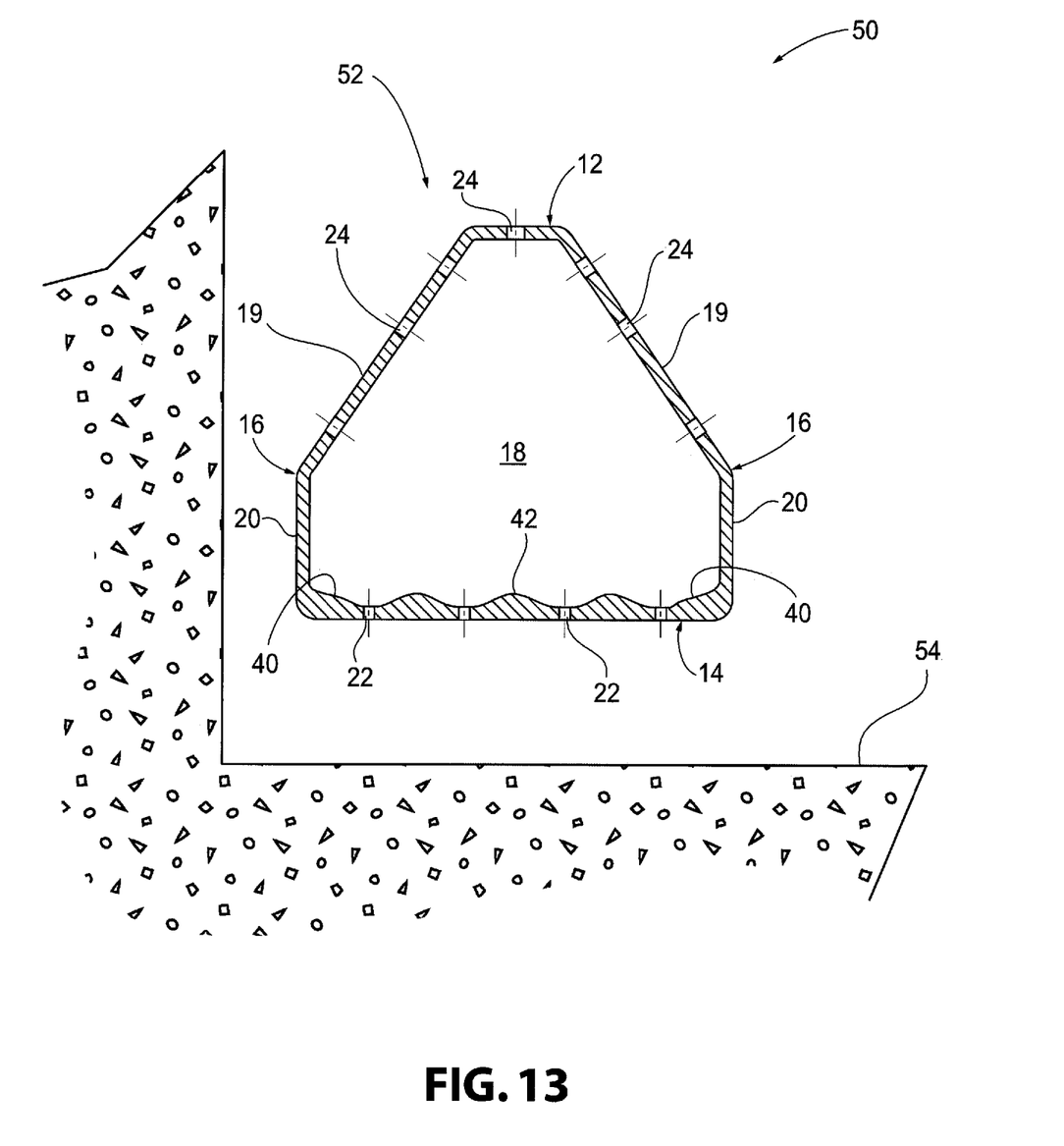
FIG. 13 is a front view of an underdrain filtering system according to one embodiment of the present invention.

As indicated, and referring to FIG. 13, the present invention is also directed to an underdrain filtering system 50. The system 50 includes one or a plurality of underdrain laterals 52 that are independently formed by the previously described underdrain blocks 10. The underdrain laterals 52 are positioned and secured to a filter floor 54 with fasteners including, but not limited to, bolts. As shown in FIG. 13, the underdrain laterals 52 are spaced apart from the filter floor 54 to allow water and other materials to enter and exit the underdrain laterals 52 through the orifices 22 formed through the bottom wall 14. In some embodiments, the space is formed with a spacer such as a lug spacer used with the fastener.

Figure 14:
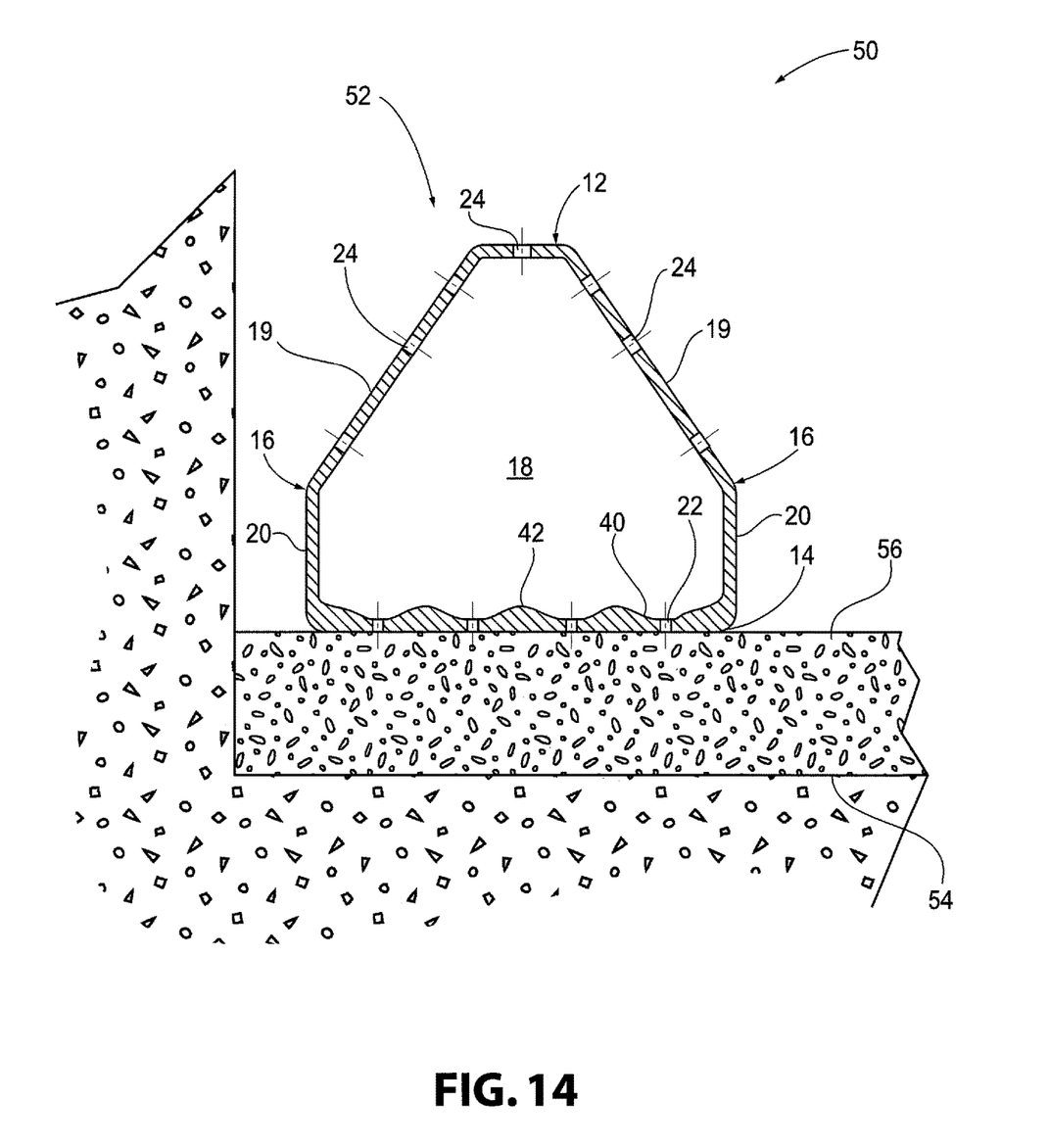
FIG. 14 is a front view of the underdrain filtering system shown in FIG. 13 with the underdrain lateral placed over gravel.
Figure 15:
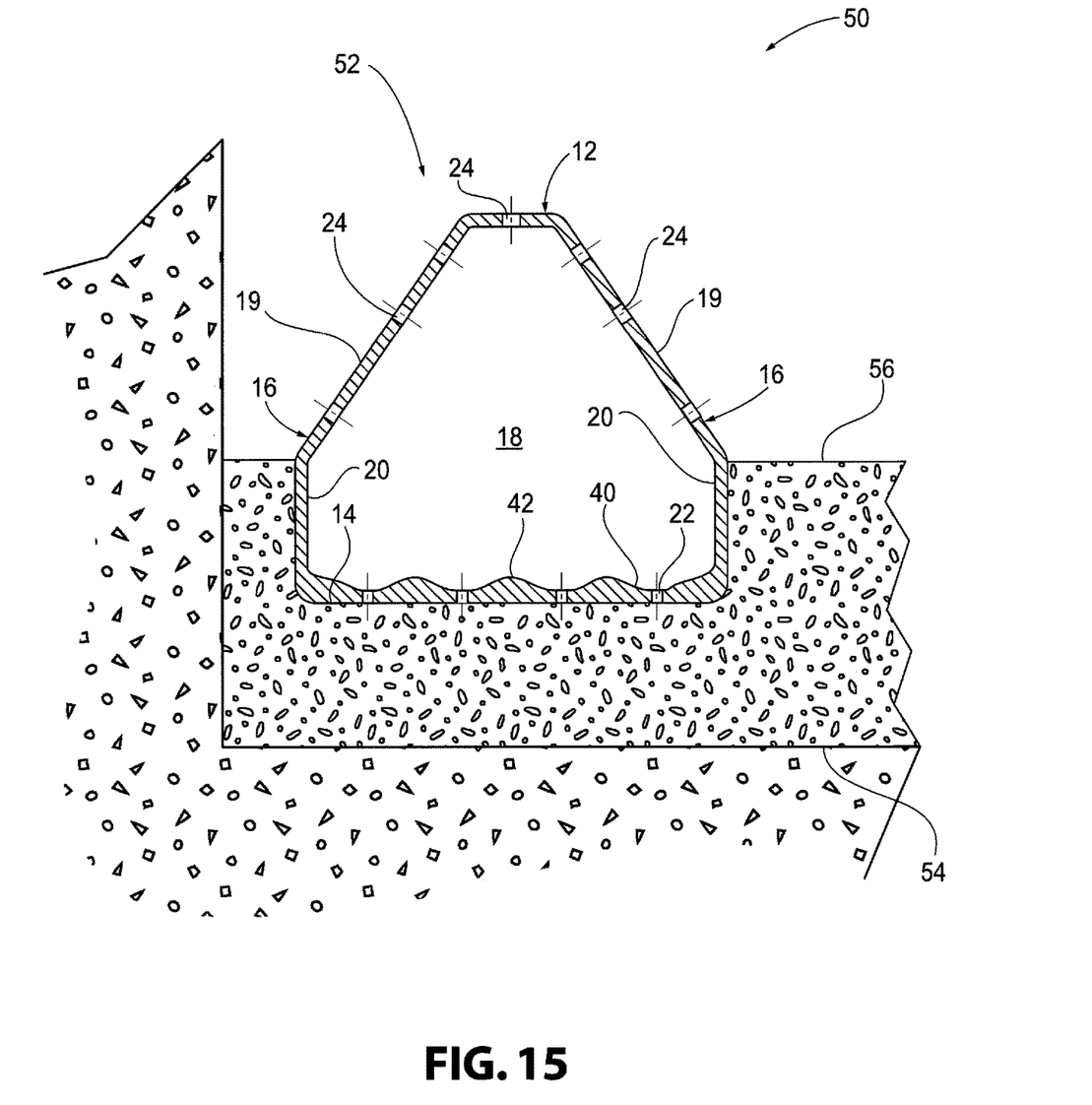
FIG. 15 is a front view of the underdrain filtering system shown in FIG. 13 with the underdrain lateral positioned within gravel in which the gravel surrounds a portion of the side walls.

In certain embodiments, as shown FIG. 14, gravel 56 is placed over the filter floor 54 and the underdrain laterals 52 are placed over the gravel 56. The gravel 56 can help level the underdrain laterals 52 and form a space between the underdrain laterals 52 and the filter floor 54. The gravel 56 also allows water and other materials to filter through so that the water and other materials can enter and exit the underdrain laterals 52 through the orifices 22 formed through the bottom wall 14. In some embodiments, referring to FIG. 15, gravel 56 can be placed around the side walls 16 of the underdrain laterals 52. For example, the gravel 56 can be placed around a portion of the side walls 16 such as the non-sloped sections 20 of the side walls 16 as shown in FIG. 15.

After securing the underdrain laterals 52 to the filter floor 54, filtering media (not shown) is poured over the underdrain laterals 52. Non-limiting examples of filtering media include sand, anthracite, granular activated carbon, ion exchange resins, and combinations thereof. One or multiple layers of filtering media are formed on top of each underdrain lateral 52. Filtering media is also poured between consecutively placed underdrain laterals 52.

It is appreciated that the underdrain laterals 52 are not secured to the filter floor 54 with grouting material as found in other types of underdrain systems. In some embodiments, the underdrain system 50 of the present invention only uses grout as sealant material for connecting the underdrain laterals 52 to the flume. Therefore, in some embodiments, the underdrain system 50 is free of grout in other areas such as between the filter floor 54 and the bottom of the underdrain laterals 52 and/or between consecutive underdrain laterals 52.

The present invention is further directed to a method of filtering water through the underdrain system 50. The method includes filtering water through the filtering media, allowing the filtered water to enter the internal chamber 18 through at least the orifices 22 formed through the bottom wall 14, and distributing the filtered water to a flume. It is appreciated that the filtered water can also enter the internal chamber 18 through the additional orifices 24 when present.

The method further includes a backwashing process in which clean water and air are distributed through the internal chamber 18 of the underdrain laterals 52. At least some of the clean water flushes any undesirable or unwanted materials (e.g. debris, media, chemical precipitation, and biological matter) out of the internal chamber 18 through the orifices 22 formed through the bottom wall 14. Clean water exiting the orifices 22 also flushes out any stagnant water found underneath the underdrain laterals 52.

It was found that the underdrain system 50 of the present invention can efficiently filter contaminated water during a filtering process while also being able to effectively remove undesirable or unwanted materials and stagnant water from the system 50 during a backwashing process.

In certain embodiments, the underdrain blocks 10 and underdrain laterals 52 of the present invention are mass produced as a standard, that can be factory or field modified (calibrated) to reduce maldistribution of backwash water by adding or subtracting a number of orifices 22 in the bottom wall 14. This allows for validation of even distribution along the underdrain lateral 52 calculated as a percentage of maldistribution across multiple zones of the individual lateral 52. As such, in certain embodiments, the present invention includes a method of preparing an underdrain block 10 and/or lateral 52 for providing even distribution of backwash water along the underdrain lateral 52. The method includes: providing one or a plurality of underdrain blocks 10 that each independently have a top wall 12, a bottom wall 14, and two side walls 16 connecting the top wall 12 to the bottom wall 14 to define an internal chamber 18 in which the bottom wall 14 comprises a plurality of orifices 22 that allow liquid and/or solid materials to enter and exit the internal chamber 18; and forming an underdrain lateral 52 with the one or a plurality of underdrain blocks 10 such that portions of the underdrain lateral 52 or individual underdrain blocks 10 have orifices 22 of different sizes and/or a different quantity of orifices 22 to improve even distribution of the backwash water along an underdrain lateral 52.

The underdrain blocks 10 of the present invention can also be factory calibrated to discharge known volumes of backwash water as a function of measured internal pressure and as a further function of relative underdrain block 10 position within an underdrain lateral 52 and a standard number or adjusted number of orifices 22 in the bottom wall 14. As such, the present invention further includes a method of validating even distribution of backwash water across an underdrain lateral 52 that includes: providing at least one underdrain lateral 52 formed by one or a plurality of underdrain blocks 10 that each independently include a top wall 12, a bottom wall 14, and two side walls 16 connecting the top wall 12 to the bottom wall 14 to define an internal chamber 18, in which the bottom wall 14 has a plurality of orifices 22 that allow liquid and/or solid materials to enter and exit the internal chamber 18; measuring an internal pressure of the underdrain lateral at a given zone or individual underdrain block 10; and calibrating the underdrain lateral 52 to discharge a known volume of backwash water at a given zone or individual underdrain block 10 as a function of the measured internal pressure, a position of at least one zone or underdrain block 10 within the underdrain lateral 52, and a number of orifices 22 in the bottom wall 14 of the at least one underdrain block 10. In some embodiments, the underdrain lateral 52 is in-situ field verified to confirm the even discharge of the volume of backwash water along the underdrain lateral 52 by comparing the measured internal pressure with known data correlating internal pressure, the position of the at least one underdrain block 10 within the underdrain lateral 52, and the number of orifices 22 in the bottom wall 14 of the at least one underdrain block 10.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. An underdrain block comprising a top wall, a bottom wall, and two side walls connecting the top wall to the bottom wall to define an internal chamber,
   wherein the bottom wall comprises orifices that allow liquid and solid materials to enter and exit the internal chamber,
   wherein the bottom wall comprises internal channels formed through an inner surface of the bottom wall, and
   wherein the orifices are positioned within the channels.

2. The underdrain block of claim 1, wherein the internal channels are shaped into troughs.

3. The underdrain block of claim 1, wherein the side walls comprise additional orifices.

4. The underdrain block of claim 1, wherein the side walls are sloped such that the bottom wall has a greater width than the top wall.

5. The underdrain block of claim 4, wherein each side wall comprises a sloped section and a non-sloped section, and wherein the sloped section extends from the top wall to the non-sloped section and the non-sloped section extends from the sloped section to the bottom wall.

6. The underdrain block of claim 5, wherein the sloped section of the side walls comprise additional orifices and the non-sloped section of the side walls are free of orifices.

7. The underdrain block of claim 1, further comprising an internal wall that extends between the side walls to form a first zone and a second zone,
wherein the first zone is formed between the top wall, the side walls, and the internal wall, and the second zone is formed between the bottom wall, the side walls, and the internal wall.

8. The underdrain block of claim 7, wherein the side walls of the first zone comprise additional orifices, and the side walls of the second zone are free of orifices.

9. An underdrain lateral formed from one or a plurality of underdrain blocks according to claim 1.

10. An underdrain filtering system comprising:
at least one underdrain lateral secured to a filter floor that is formed by one or a plurality of underdrain blocks that each independently comprise a top wall, a bottom wall, and two side walls connecting the top wall to the bottom wall to define an internal chamber,
wherein the bottom wall, or a lower portion of at least one side wall, or both, comprises a plurality of orifices and wherein the underdrain lateral is spaced apart from the filter floor to allow liquid and/or solid materials to enter and exit the internal chamber, and
wherein the bottom wall of the at least one underdrain block comprises internal channels formed through an inner surface of the bottom wall, and wherein the orifices are positioned within the channels.

11. The underdrain filtering system of claim 10, further comprising gravel placed between the filter floor and the underdrain lateral.

12. The underdrain filtering system of claim 11, wherein the gravel is further placed around at least a portion of the side walls.

13. The underdrain filtering system of claim 10, wherein the underdrain filtering system is free of grout.

14. The underdrain filtering system of claim 10, wherein the side walls comprise additional orifices.

15. The underdrain filtering system of claim 10, wherein the side walls are sloped such that the bottom wall has a greater width than the top wall.

16. The underdrain filtering system of claim 15, wherein each side wall comprises a sloped section and a non-sloped section, and wherein the sloped section extends from the top wall to the non-sloped section and the non-sloped section extends from the sloped section to the bottom wall.

17. The underdrain filtering system of claim 10, wherein the underdrain blocks further comprise an internal wall that extends between the side walls to form a first zone and second zone,
wherein the first zone is formed between the top wall, the side walls, and the internal wall, and the second zone is formed between the bottom wall, the side walls, and the internal wall.

18. An underdrain block comprising a top wall, a bottom wall, two side walls connecting the top wall to the bottom wall to define an internal chamber, and an internal wall that extends between the side walls to form a first zone and a second zone, wherein the first zone is formed between the top wall, the side walls, and the internal wall, and the second zone is formed between the bottom wall, the side walls, and the internal wall, and
wherein the bottom wall comprises orifices that allow liquid and solid materials to enter and exit the internal chamber, and the side walls of the first zone comprise additional orifices, and the side walls of the second zone are free of orifices.

* * * * *

UNITED STATES PATENT AND TRADEMARK OFFICE
CERTIFICATE OF CORRECTION

PATENT NO. : 10,881,989 B2
APPLICATION NO. : 15/980955
DATED : January 5, 2021
INVENTOR(S) : Dean T. Berkebile et al.

It is certified that error appears in the above-identified patent and that said Letters Patent is hereby corrected as shown below:

In the Claims

Column 8, Line 65, Claim 4, delete "wherein" and insert -- wherein at least a portion of --

Column 10, Line 5, Claim 13, delete "grout." and insert -- grout in at least an area between the underdrain lateral and the filter floor. --

Column 10, Line 8, Claim 15, delete "wherein" and insert -- wherein at least a portion of --

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*